United States Patent [19]

Ficchi, Jr.

[11] Patent Number: 5,653,482
[45] Date of Patent: Aug. 5, 1997

[54] SEAL SYSTEM FOR DUCT NETWORK

[76] Inventor: Vincent Ficchi, Jr., 6 Avery Pl., Utica, N.Y. 13502

[21] Appl. No.: 573,559

[22] Filed: Dec. 15, 1995

[51] Int. Cl.⁶ .................................................. F16L 23/00
[52] U.S. Cl. ..................... 285/405; 285/363; 285/424; 285/915
[58] Field of Search .................................. 285/424, 363, 285/405, 364, 915, 410

[56] References Cited

U.S. PATENT DOCUMENTS

| | | | |
|---|---|---|---|
| 3,003,794 | 10/1961 | Burley | 285/363 X |
| 3,800,846 | 4/1974 | Kurz | 285/424 |
| 3,892,049 | 7/1975 | Adams, Jr. | 285/363 X |
| 4,040,449 | 8/1977 | Butler et al. | 285/363 X |
| 4,252,350 | 2/1981 | Smitka | 285/363 |
| 4,288,115 | 9/1981 | Sullivan . | |
| 4,466,641 | 8/1984 | Herlman . | |
| 4,508,376 | 4/1985 | Arnoldt . | |
| 4,509,778 | 4/1985 | Arnoldt . | |
| 4,537,430 | 8/1985 | Sullivan . | |
| 4,558,892 | 12/1985 | Daw et al. . | |
| 4,584,756 | 4/1986 | Arnoldt . | |
| 4,662,661 | 5/1987 | Arnoldt . | |
| 5,022,688 | 6/1991 | Arnoldt . | |
| 5,165,189 | 11/1992 | Besal | 138/92 |
| 5,165,736 | 11/1992 | De Waal | 285/424 |
| 5,356,184 | 10/1994 | Hunter . | |
| 5,393,106 | 2/1995 | Schroeder | 285/424 X |

*Primary Examiner*—Terry Lee Melius
*Assistant Examiner*—Heather Shackelford
*Attorney, Agent, or Firm*—Harris Beach & Wilcox, LLP

[57] ABSTRACT

A seal system for joining the ends of two generally rectangular duct sections, including two frames secured to each other with a seal and attached to their respective duct end sections. The frame members each include four flange portions and four corner pieces. Each flange portion has an upstanding channel shaped leg portion and an angularly extending duct receiving leg portion. A corner piece connects adjacent flange portions to form the generally rectangular frame. The end portions of the ducts are inserted into longitudinal openings of the duct receiving leg portions. A seal, having four angular corner pieces and four linear pieces, is positioned between the frames to connect the duct sections. The overlap of the angular corner pieces and the four linear pieces establishes an effective seal to prevent air within the duct from escaping.

14 Claims, 2 Drawing Sheets

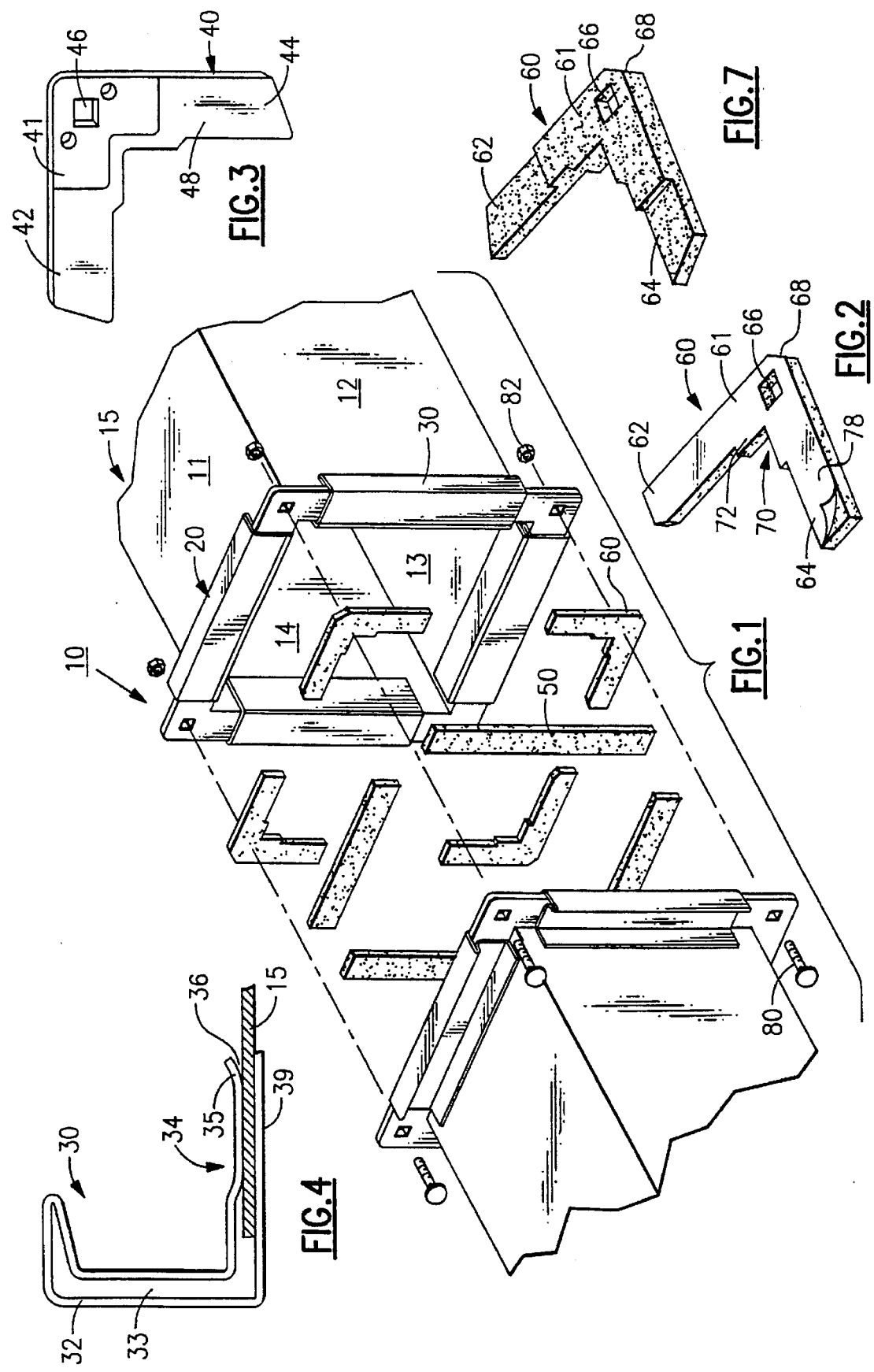

SEAL SYSTEM FOR DUCT NETWORK

BACKGROUND OF THE INVENTION

1. Field of the Invention

This invention relates generally to duct networks, and specifically to seal systems used in providing an airtight joint between the ends of adjacent duct sections.

2. Discussion of the Related Art

This invention relates to a seal system for providing an airtight joint between two duct sections. More specifically, the invention encompasses a seal attached to rectangular frames which connect the duct sections.

Prior art duct systems have utilized linear strips of adhesive back sealing material that must be crimped at the corners. The crimping action produces voids through which air may escape. In large duct networks, large volumes of air are moved through the network under high pressures. A void between duct sections, even if small to begin with, may develop into a larger void, potentially halting the operation of the entire network by depressurizing the duct network.

The excess bunching of the sealing gasket also obstructs the airway through the duct. Due to the seal being forced into a shape it is not designed for, the excess portions of the sealing gasket around corners may obstruct the airflow in the duct. At high pressures, these gasket pieces may break loose, and create further problems within the duct.

Another type of sealing gasket is disclosed in the prior art. Arnoldt U.S. Pat. No. 4,662,661 discloses a flange type duct assembly and seal arrangement. A seal is shown in the drawings as an endless rectangular loop. Arnoldt U.S. Pat. No. 5,022,688 again shows a continuous one-piece seal mounted between the flanges.

These sealing gaskets are cut into the rectangular shape desired, but are difficult to install. There is considerable waste of material, and the gasket is difficult to affix to the frame due to its awkward shape. If a mistake is made in affixing the gasket, it must be discarded and the process restarted.

OBJECTS AND SUMMARY OF THE INVENTION

The principal object of the present invention is to improve seal systems for creating airtight joints between rectangular duct sections. Another object of the invention is to provide a seal system that is easy to install.

A further object of the present invention is to provide a seal system that creates little waste of material.

Yet another object of the present invention is to provide a seal system where no crimping of a gasket is necessary.

Another object of the present invention is to provide a seal system that does not obstruct the flow of air in the duct system.

These and other objects of the present invention are attained by providing a seal system for joining together the ends of two generally rectangular duct sections including two frames secured to each other with an airtight joint mounted therebetween. A plurality of angular corner pieces connect adjacent flange portions to form a generally rectangular frame. The flange portions each have an upstanding channel shaped leg portion and a duct receiving leg portion. The seal is composed of four angular corner pieces and four linear pieces and is positioned between the frames, used to connect the duct sections. The corner seal pieces generally complement and abut the corner frame pieces and a portion of the adjacent flange. The linear pieces are placed abutting the flange portions and superimposed over or under the corner pieces. This overlapping of the pieces ensures an airtight joint when the seal parts are compressed together by a fastening means.

BRIEF DESCRIPTION OF THE DRAWINGS

For a fuller understanding of the nature and objects of the invention, reference should be made to the following detailed description of the preferred embodiment, read in connection with the accompanying drawings, in which:

FIG. 1 is a fragmentary, exploded perspective view of a flange type duct joint assembly for connecting two duct sections, illustrating a plurality of angular corner seal pieces and linear seal pieces used to provide an airtight joint between the two ducts by their respective frames;

FIG. 2 is an enlarged perspective view of an angular corner seal piece with an adhesive backing, illustrating a right angle configuration;

FIG. 3 is an enlarged perspective view of a corner frame piece;

FIG. 4 is an enlarged end view in section of the duct enclosed in the duct receiving portion of the flange;

FIG. 7 is an enlarged perspective view showing a second embodiment of a corner seal piece having an enlarged seal section at the corner of the piece.

DETAILED DESCRIPTION OF THE INVENTION

Figure 5:
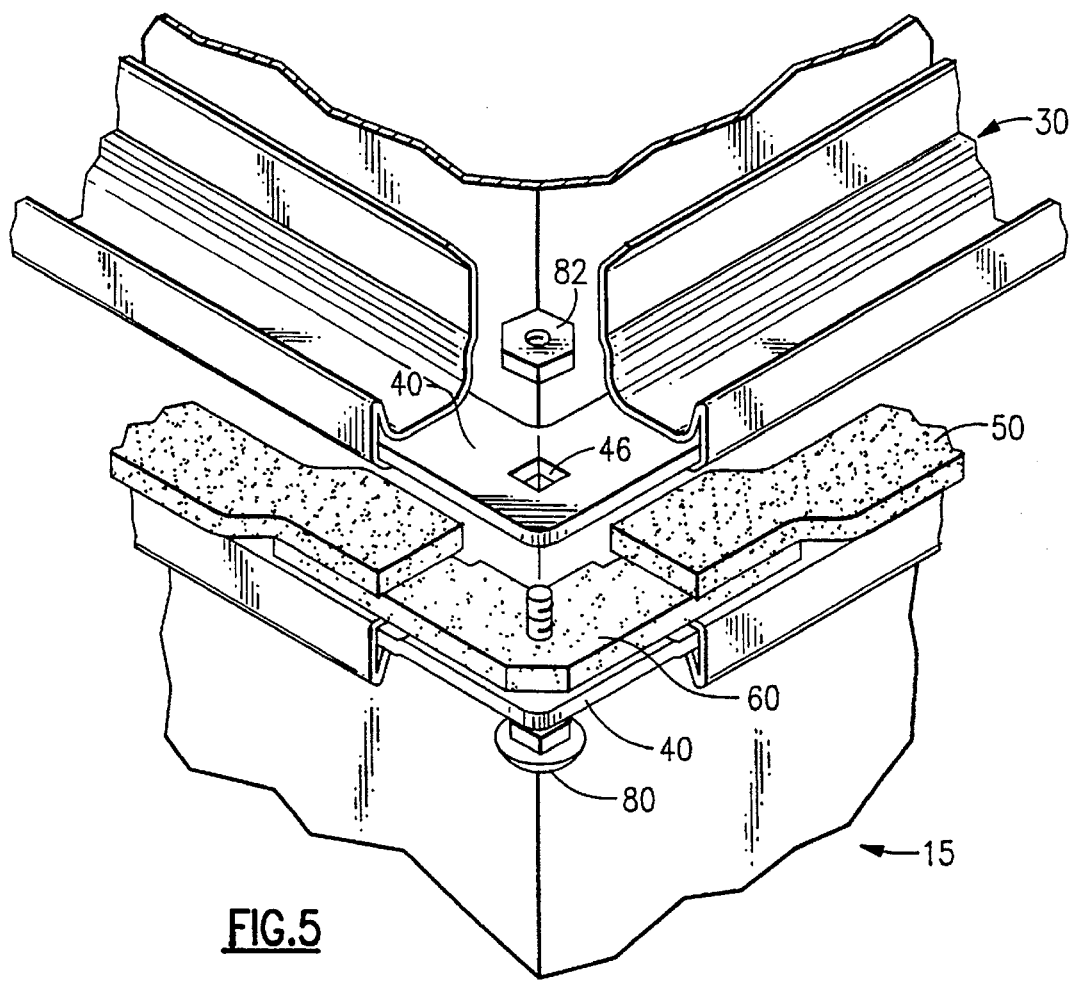
FIG. 5 is a fragmentary, exploded perspective view of a corner section of the end portion of a duct sealingly connected to two adjacent flanges connected by a corner piece illustrating the edge of the duct extending beyond a flange portion of the corner piece; a threaded bolt is shown extending through the seal and corner pieces.

Referring initially to FIG. 1, there is shown a fragmentary, exploded perspective view of the seal system, generally referenced 10, illustrating the end portion of a pair of duct sections 15 in which each duct section 15 has a generally rectangular configuration. These duct sections 15 are portions of large duct networks which move high volumes of air usually in large buildings. Each of the ducts preferably is fabricated from galvanized sheet material and may have various thicknesses.

The end portions of the duct sections 15 are secured to each other by a pair of frames generally designated by the numeral 20. These frames 20 secure the duct sections 15 together utilizing a fastening means, usually a bolt 80 and nut 82. Each frame 20 is formed by a plurality of duct connecting flanges 30 and a plurality of corner frame pieces 40. The frames 20 are formed by first cutting preselected lengths of strips having preformed flanges 30. Next, corner frame pieces 40 having a generally planar configuration are attached to adjacent flanges. Each corner frame piece 40 has a corner frame section 41 and frame legs 42 and 44 extending angularly therefrom in the same plane as corner frame section 41. The frame legs 42 and 44 are arranged to extend into the opening 33 of upstanding channel shaped leg portion 32 of flange 30 while the corner frame section 41 remains outside the flange portion opening 33, thus forming the frame used to connect the duct sections. The corner frame piece 40 has a front planar surface 48, which allows the seal to be affixed thereto. The corner frame section 41 also has a bolt aperture 46 arranged to receive a connecting bolt.

With the corner frame pieces 40 secured in the openings, the generally rectangular frame 20 is then secured to the end of the duct 15 by passing the duct walls 11–14 between the legs 35 and 37 of the respective duct receiving leg portion 34 in opening 36 of flange 30. Corner seal pieces 60 having a generally planar configuration with corner section 61, are approximately the same size as corner frame pieces 40. Legs 62 and 64 extend angularly from the corner seal section 61 in the same plane. These corner seal pieces 60 are attached by adhesive backing 78 to front planar surface 48 of corner frame piece 40. Then linear seal pieces 50 having a generally planar configuration that are pre-cut to the desired length are overlapped over corner seal pieces 60 to form seal assembly 69. Alternate embodiments include legs 62 and 64 having a lower profile than the corner section 61.

Bolts 80 are inserted through the respective apertures 46 and 66, and nuts 82 are threadedly secured to the bolts 80 to thus secure the corner pieces 40 together, with the seal assembly 69 therebetween.

In FIG. 2 there is shown an enlarged perspective view of a corner seal piece 60 with a corner seal section 61 and seal legs 62 and 64. Corner seal section 61 has a square-cut hole 66 to accommodate a bolt for securing the system together. The cut-off outside corner 68 streamlines the outside of the duct network by ensuring there is no excess seal protruding therefrom. The outside corner may also have a cut-off portion, or a rounded edge. The lower corner portion 70 has an L-shaped offset portion 72, whose shape prevents a portion of the seal from entering the air duct. The top face 76 of the corner seal piece 60 has adhesive backing 78 to secure the corner seal to a corner piece and to permit ease of installation. These corner seal pieces may be fabricated from a foam-like material such as polyurethane, a neoprene gasket material, a nondrying polymer based tape, or fireproof material.

In FIG. 3 there is shown an enlarged perspective view of a corner frame piece 40 with a corner frame section 41, front planar surface 48, and frame legs 42 and 44. Corner frame section 41 has a square-cut hole 46 to accommodate a bolt similar to square-cut hole 66 of corner seal piece 60, thereby ensuring the proper alignment of the seal with the frame. Front planar surface 48 is flat to allow corner seal piece 60 to be affixed thereon. Frame legs 42 and 44 are secured to the flanges, resulting in the rectangular shape of the frame.

In FIG. 4 there is shown a fragmentary sectional view of the end portion of the duct 15 enclosed in the opening 36 of the duct receiving portion 34. The duct 15 is shown to be placed between legs 35 and 37 of flange 30, thereby connecting the duct with the frame. Upstanding channel shaped leg portion 32 of the flange has opening 33 to receive the legs of the corner pieces.

In FIG. 5 there is shown a fragmentary, exploded perspective view of the joinder of the duct sections 15 with the linear seal pieces 50 overlapping the corner seal pieces 60, which provides the airtight joint. The seal is sandwiched between the frames which are connected to the ducts. The system is secured by a nut and bolt.

Figure 6:
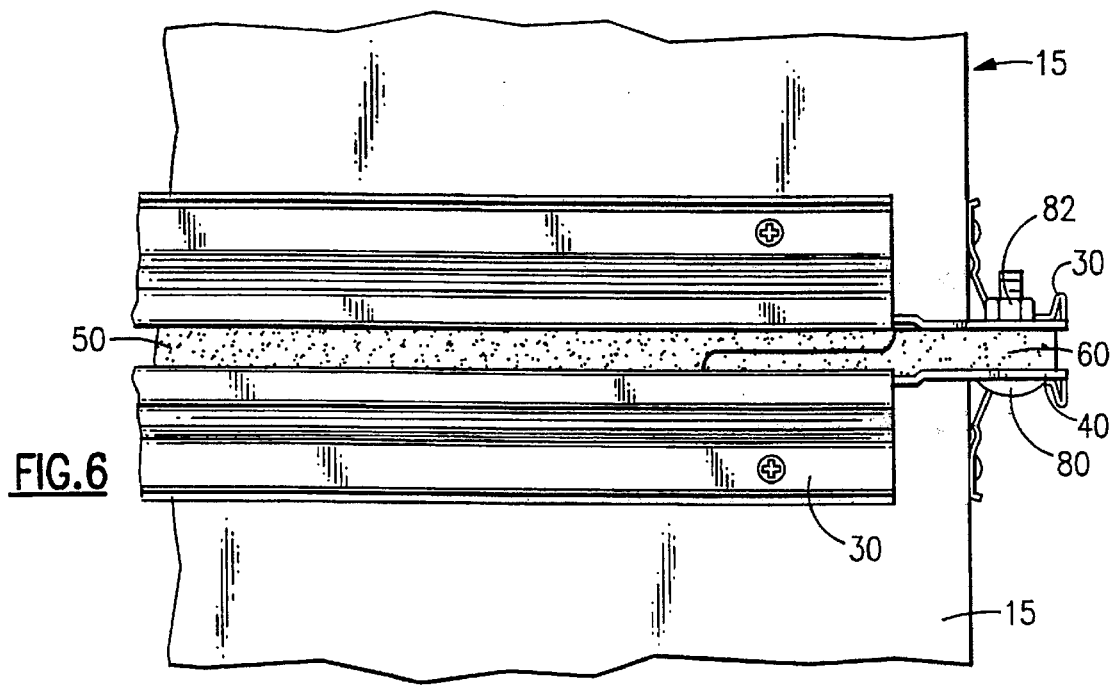
FIG. 6 is a partial top elevational view of the joinder of two duct sections with a corner seal mounted therebetween.

In FIG. 6 there is shown a top elevational view of the joined duct sections 15, the flanges 30, the corner piece 40, the linear seal 50, the corner seal 60, the bolt 80 and the nut 82. This figure illustrates the compression of the two frame members together, sandwiching the seal assembly in between, where the overlapping seals compress together to form an airtight joint.

In FIG. 7 there is shown an enlarged perspective view of a corner seal piece 60 with a corner seal section 61. Seal legs 62 and 64 are of lower profile than corner seal section 61, in order to facilitate ease of superimposition either over or under of the linear seal pieces 50. The ends of legs 62 and 64 may be cut at angles so that more seal is adjacent to the inside of the duct to provide more sealing to the high-pressure area. Corner seal section 61 has a square-cut hole 66 and a cut-off outside corner 68 which streamlines the outside of the duct network. The outside corner may also have a rounded edge.

While this invention has been explained with reference to the structure disclosed herein, it is not confined to the details as set forth and this application is intended to cover any modifications and changes as may come within the scope of the following claims.

We claim:

1. Apparatus for forming an airtight joint between two duct sections comprising a pair of frames having corner pieces co-joined by linear pieces, each of said frames secured to each duct section and having complementary outer surfaces that are brought together to join said duct sections;

an angular corner seal positioned between said frames at each corner, said corner seal being die cut from a foam sheet and having an adhesive backing on at least one face thereof for attaching said corner seal to said outer surface of one of said frames;

a linear seal extending between adjacent corner seals, each linear seal having a length such that it overlaps the two adjacent corner seals, said linear seals each having an adhesive backing for attaching said linear seal to the outer surface of at least one of said frames and to the overlapped sections of adjacent corner pieces; and a means for fastening said frames together in face-to-face contact with sufficient force to compress the seals between said frames to form an airtight joint therebetween.

2. Apparatus for forming an airtight joint between two duct sections comprising a pair of frames having corner pieces co-joined by linear pieces, each of said frames secured to each duct section and having complementary outer surfaces that are brought together to join said duct sections;

an angular corner seal positioned between said frames at each corner, said corner seal being die cut from a foam sheet and having an adhesive backing on at least one face thereof for attaching said corner seal to said outer surface of one of said frames;

a linear seal extending between adjacent corner seals, each linear seal having a length such that it overlaps the two adjacent corner seals, said linear seals each having an adhesive backing for attaching said linear seal to the outer surface of at least one of said frames and to the overlapped sections of adjacent corner pieces, wherein said linear seal overlaps at least one-half of said leg of said corner seal; and a means for fastening said frames together in face-to-face contact with sufficient force to compress the seals between said frames to form an airtight joint therebetween.

3. The apparatus for forming an airtight joint between two duct sections of claim 1, wherein said corner seal and said linear seal are made from a foam-type material.

4. The apparatus for forming an airtight joint between two duct sections of claim 3, wherein said corner seal and said linear seal are made from polyurethane.

5. The apparatus for forming an airtight joint between two duct sections of claim 1, wherein said corner piece and said corner seal each have a square-cut hole of substantially equal size through which is placed a fastening means.

6. Apparatus for forming an airtight joint between two duct sections comprising a pair of frames having corner pieces co-joined by linear pieces, each of said frames secured to each duct section and having complementary outer surfaces that are brought together to join said duct sections;

an angular corner seal positioned between said frames at each corner, said corner seal being die cut from a foam sheet and having an adhesive backing on at least one face thereof for attaching said corner seal to said outer surface of one of said frames, wherein said corner seal includes a corner section and legs extending therefrom, said legs having a thickness less than the thickness of said corner section;

a linear seal extending between adjacent corner seals, each linear seal having a length such that it overlaps the two adjacent corner seals, said linear seals each having an adhesive backing for attaching said linear seal to the outer surface of at least one of said frames and to the overlapped sections of adjacent corner pieces; and a means for fastening said frames together in face-to-face contact with sufficient force to compress the seals between said frames to form an airtight joint therebetween.

7. The apparatus for forming an airtight joint between two duct sections of claim 6, wherein said corner seal includes a corner section substantially thicker than said legs.

8. The apparatus for forming an airtight joint between two duct sections of claim 1, wherein said corner seal includes an outer corner having an angle of 90 degrees.

9. The apparatus for forming an airtight joint between two duct sections of claim 1, wherein said corner seal includes an outer corner having a cut-off outside corner.

10. The apparatus for forming an airtight joint between two duct sections of claim 1, wherein said corner seal includes an outer rounded edge.

11. The apparatus for forming an airtight joint between two duct sections of claim 1, wherein said corner seal includes a corner section and legs extending therefrom, said legs having substantial length.

12. The apparatus for forming an airtight joint between two duct sections of claim 1, wherein said corner seals and said linear seals are made from of neoprene gasket material.

13. The apparatus for forming an airtight joint between two duct sections of claim 1, wherein said corner seals and said linear seals are made from nondrying polymer based tape.

14. The apparatus for forming an airtight joint between two duct sections of claim 1, wherein said corner seals and said linear seals are made from fireproof material.

* * * * *